United States Patent [19]

Cook

[11] Patent Number: 6,161,309

[45] Date of Patent: Dec. 19, 2000

[54] HEAT SHRINK TOOL HOLDER COOLER

[76] Inventor: Harold D. Cook, 33642 Via Martos, Dana Point, Calif. 92629

[21] Appl. No.: 09/301,298

[22] Filed: Apr. 28, 1999

[51] Int. Cl.[7] .................................................. F26B 7/00
[52] U.S. Cl. .............................. 34/395; 34/391; 34/428; 34/62; 34/66
[58] Field of Search ................................ 34/60, 62, 66, 34/67, 202, 210, 214, 218, 380, 391, 393, 395, 428, 430, 433, 237; 62/293; D8/71

[56] References Cited

U.S. PATENT DOCUMENTS

| D. 277,358 | 1/1985 | Krencik ........................................ D8/71 |
| D. 320,730 | 10/1991 | Ediger et al. ............................... D8/71 |
| D. 342,432 | 12/1993 | Sadoway ..................................... D8/71 |
| 0,845,717 | 2/1907 | Miller ....................................... 403/370 |
| 1,285,589 | 11/1918 | Barnes . | 
| 1,404,016 | 1/1922 | Engelbrekt . |
| 1,409,753 | 3/1922 | Moore . |
| 1,539,413 | 5/1925 | Fish . |
| 1,658,504 | 2/1928 | Weiss . |

(List continued on next page.)

FOREIGN PATENT DOCUMENTS

| 0026751 | 4/1981 | European Pat. Off. ............. 279/11 X |
| 382079B1 | 8/1993 | European Pat. Off. . |
| 0575009 | 4/1933 | Germany . |
| 0662704 | 6/1938 | Germany . |
| 1008546 | 5/1957 | Germany . |
| 1008085 | 10/1957 | Germany . |
| 1238311 | 4/1967 | Germany . |
| 2229374 | 1/1974 | Germany ............................... 279/1 A |
| 2759007 | 8/1978 | Germany ........................... 408/239 A |
| 2811977 | 9/1979 | Germany . |
| 3701602 | 8/1988 | Germany . |
| 3925641C2 | 9/1992 | Germany . |
| 5316976 | 2/1978 | Japan ..................................... 279/1 A |
| 57107710 | 5/1982 | Japan ..................................... 279/9.1 |
| 0376182 | 5/1979 | U.S.S.R. . |
| 1493389 | 7/1989 | U.S.S.R. . |
| 0425539 | 4/1935 | United Kingdom . |
| 0551065 | 2/1942 | United Kingdom . |
| 0729295 | 5/1955 | United Kingdom ....................... 279/8 |
| 0921522 | 3/1963 | United Kingdom ................... 340/279 |
| 1319200 | 6/1973 | United Kingdom . |
| 2137124A | 10/1984 | United Kingdom ....................... 279/7 |

OTHER PUBLICATIONS

Coolant Adapters (Flush Cut) by X–L Tool Company; 1 page.

MI–Tech Metals, Inc., "High Density Tungsten Based Metals" 4 pages.

*Primary Examiner*—Denise L. Ferensic
*Assistant Examiner*—Andrea M. Joyce
*Attorney, Agent, or Firm*—Stetina Brunda Garred & Brucker

[57] ABSTRACT

A cooling unit reduces the temperature of heat shrink tool holders and extensions to ambient temperature. The cooling unit includes a housing with a removable cooling tray. The cooling tray is formed with a plurality of receptacles configured to accommodate a heat shrink tool holder or extension. Additionally, a blower is disposed within the housing for propelling a flow of ambient temperature air over the cooling tray to cool the heat shrink tool holders or extensions to ambient temperature. The blower in the cooling unit may be an axial fan with an axial inlet in fluid communication with the ambient temperature air and a radial outlet to direct the flow of air over the cooling tray. Additionally, the housing may further includes a damper disposed between the radial outlet of the fan and the cooling tray for selectively regulating the flow of air over the cooling tray.

13 Claims, 2 Drawing Sheets

U.S. PATENT DOCUMENTS

| | | | |
|---|---|---|---|
| 1,936,498 | 11/1933 | Corbett | 76/108 |
| 1,994,792 | 3/1935 | Sanderson | 255/63 |
| 2,058,618 | 10/1936 | Patzig | 287/20 |
| 2,125,005 | 7/1938 | Jearum | 29/96 |
| 2,161,062 | 6/1939 | Killgore | 262/33 |
| 2,374,919 | 5/1945 | Bruseth | 90/11 |
| 2,729,458 | 1/1956 | Sacrey | 279/41 |
| 2,860,547 | 11/1958 | Stephan | 90/11 |
| 2,893,291 | 7/1959 | Hollis | 90/11 |
| 2,913,935 | 11/1959 | Flannerty et al. | 77/58 |
| 2,918,290 | 12/1959 | Werstein | 279/19 |
| 2,920,913 | 1/1960 | Antila | 287/119 |
| 2,942,891 | 6/1960 | Zale | 279/1 |
| 3,053,118 | 9/1962 | Lavallee | |
| 3,221,404 | 12/1965 | Averill et al. | 29/568 |
| 3,267,585 | 8/1966 | Futer | 34/20 |
| 3,307,243 | 3/1967 | Andreasson | 29/106 |
| 3,372,951 | 3/1968 | McCash | 287/91 |
| 3,397,615 | 8/1968 | Meinke | 90/11 |
| 3,424,055 | 1/1969 | Rollat | 90/11 |
| 3,463,048 | 8/1969 | Owsen | 90/11 |
| 3,557,419 | 1/1971 | Flannery | 29/105 |
| 3,643,546 | 2/1972 | Richter et al. | 90/11 A |
| 3,678,632 | 7/1972 | Eversole et al. | 408/144 |
| 3,725,994 | 4/1973 | Wechsler | 29/447 |
| 3,734,515 | 5/1973 | Dudek | 279/1 A |
| 3,807,804 | 4/1974 | Kniff | 299/91 |
| 3,876,320 | 4/1975 | Phillipson | 403/370 |
| 3,937,587 | 2/1976 | Lindem et al. | 408/181 |
| 3,945,752 | 3/1976 | Bennett | 408/146 |
| 3,989,260 | 11/1976 | Zonkov et al. | 279/4 |
| 3,994,615 | 11/1976 | Narang | 408/226 |
| 4,021,051 | 5/1977 | Toyomoto et al. | 279/1 N |
| 4,099,889 | 7/1978 | Vig | 408/239 R |
| 4,133,545 | 1/1979 | Komori | 279/83 |
| 4,226,562 | 10/1980 | Schmid et al. | 409/233 |
| 4,251,113 | 2/1981 | Mitin et al. | 299/69 |
| 4,274,774 | 6/1981 | Haga et al. | 409/232 |
| 4,298,208 | 11/1981 | Benjamin et al. | 279/91 |
| 4,305,203 | 12/1981 | Bock et al. | 29/800 |
| 4,377,292 | 3/1983 | Staron | 279/46 R |
| 4,436,463 | 3/1984 | Rea | 409/232 |
| 4,453,775 | 6/1984 | Clemmow | 299/81 |
| 4,483,108 | 11/1984 | Howard | 51/283 R |
| 4,560,289 | 12/1985 | Wood, III | 384/99 |
| 4,619,564 | 10/1986 | Jacobson | 408/146 |
| 4,642,005 | 2/1987 | Kondo et al. | 409/232 |
| 4,668,138 | 5/1987 | Carter | 409/234 |
| 4,795,292 | 1/1989 | Dye | 409/136 |
| 4,803,787 | 2/1989 | Amann | 34/50 |
| 4,808,049 | 2/1989 | Cook | 409/234 |
| 4,811,632 | 3/1989 | Salyer | 76/101 R |
| 4,818,161 | 4/1989 | Cook | 409/233 |
| 4,934,743 | 6/1990 | Kapgan et al. | 285/23 |
| 4,971,491 | 11/1990 | Cook | 409/131 |
| 4,991,991 | 2/1991 | Ito et al. | 403/30 |
| 4,993,894 | 2/1991 | Fischer et al. | 408/14 |
| 5,024,563 | 6/1991 | Randall | 408/1 R |
| 5,048,375 | 9/1991 | Kobayashi | 76/108.6 |
| 5,052,610 | 10/1991 | Guerra et al. | 228/56.3 |
| 5,098,234 | 3/1992 | Judkins et al. | 403/204 |
| 5,150,636 | 9/1992 | Hill | 76/108.2 |
| 5,277,435 | 1/1994 | Krämer et al. | 279/9.1 |
| 5,278,354 | 1/1994 | Lhomme | 174/84 R |
| 5,280,671 | 1/1994 | Marquart | 29/447 |
| 5,311,654 | 5/1994 | Cook | 29/447 |
| 5,352,074 | 10/1994 | Ishikawa | 409/232 |
| 5,582,494 | 12/1996 | Cook | 409/234 |
| 5,588,225 | 12/1996 | Becker et al. | 34/474 |
| 5,593,258 | 1/1997 | Matsumoto et al. | 409/234 |
| 5,775,857 | 7/1998 | Johne | 409/234 |
| 5,797,605 | 8/1998 | Gross et al. | 279/4.05 |

HEAT SHRINK TOOL HOLDER COOLER

FIELD OF THE INVENTION

The present invention generally relates to cooling devices for heat shrink tool holders and more particularly to a device that uses moving air to cool heat shrink tool holders.

BACKGROUND OF THE INVENTION

Machine tool holders are used to interface the rotating spindle of a boring or milling machine to a cutting tool that will be used to machine or cut a workpiece. The cutting tool is securely mounted to the tool holder which is then drawn or pulled tightly into the spindle of the machine so as to rigidly maintain the cutting tool within the tool holder and the machine.

Recently, heat shrink tool holders have gained popularity in high tolerance machining applications for their ability to mount a cutting tool concentrically within the tool holder. In such tool holders, there is provided a central aperture sized slightly smaller than the diameter of the shank of the cutting tool to be used on the milling or grinding machine. The cutting tool is only insertable into the central aperture when the tool holder has been heated to the temperature necessary to thermally expand the tool holder and consequently the central aperture to a size which can accept the cutting tool shank. Subsequent to the insertion of the shank thereinto, the tool holder is allowed to cool to ambient temperature, thereby decreasing the size of the diameter of the central aperture. The thermal contraction of the tool holder and therefore the aperture creates a metal to metal press fit between the cutting tool and tool holder to thereby rigidly secure the cutting tool to the tool holder.

Additionally, machine tool extensions have been formed with heat shrink fittings such that cutting tools are secured to the machine tool extension by the heat shrink process. Such extensions are typically formed with a bore extending axially within one end, with the opposite end of the extension being insertable into the tool holder of a milling or boring machine. Similar to the central aperture of the heat shrink tool holder, the bore of the extension is sized slightly smaller than the shank diameter of the cutting tool. Therefore, the cutting tool shank is only insertable into the bore when the machine tool extension is heated to a temperature sufficient to thermally expand the bore to a size which can accept the cutting tool shank. Subsequent to the insertion of the shank into the bore, the cooling of the extension and the resultant thermal contraction of the bore creates a metal to metal press fit between the extension and the cutting tool, thereby rigidly securing the cutting tool to the extension.

However, while the heat shrink tool holder or extension is cooling to ambient temperature, it cannot be used for machining operations because the cutting tool is not rigidly secured to the tool holder. Therefore, after inserting the tool into the heated tool holder, the tool holder must be allowed to cool to ambient temperature in order to provide the strongest union between the cutting tool and tool holder. Only when the tool holder has cooled to ambient temperature can it be used for machining operations. Previous devices to cool tool holders and extensions have included chillers which can rapidly cool the tool holder or extension. However, such chillers are expensive to maintain and operate and are complex pieces of machinery which require special care to operate. Additionally, chillers are not environmentally friendly due to the coolants used therein and the possibility of leakage. Thus, there exists a need in the art for a heat shrink tool holder cooler that can cool heat shrink tool holders in an inexpensive and easy to maintain unit.

The present invention addresses the deficiencies in prior art coolers by providing a cooler that uses a blower to propel ambient temperature air over the heated tool holders to therefore cool the tool holders by a convection method. Therefore, the present invention provides an easy to maintain and inexpensive unit to quickly cool heat shrink tool holders or extensions to ambient temperature.

SUMMARY OF THE INVENTION

In accordance with the present invention, there is provided a cooling unit to reduce the temperature of heat shrink tool holders. The cooling unit comprises a housing, and a cooling tray that is removably mounted within the housing and has a plurality of receptacles formed therein to accommodate heat shrink tool holders. Additionally, the housing includes a blower disposed proximate the cooling tray for propelling a flow of ambient temperature air over the cooling tray to thereby cool the heat shrink tool holders. In the preferred embodiment of the present invention, the housing also includes a plurality of castors attached thereto for the purpose of making the cooling unit mobile.

Additionally, the cooling unit further defines a cooling chamber wherein the cooling tray is removably mounted therein. The cooling unit also comprises a damper disposed within the housing between the cooling chamber and the blower for selectively regulating the flow of air over the cooling tray disposed within the cooling chamber.

In accordance with the preferred embodiment of the present invention, the blower may be an axial fan having an axial inlet in fluid communication with the ambient temperature air and a radial outlet disposed adjacent to the damper. As such, the housing of the cooling unit will further comprise a fresh air inlet port in fluid communication with the axial inlet of the fan and configured to allow ambient temperature air to enter the fan. Additionally, the housing will be provided with an exhaust port disposed adjacent the cooling tray and in opposed relation to the outlet of the fan such that the propelled air will exit the housing after passing over the cooling tray disposed in the cooling chamber.

A cooling unit constructed in accordance with the preferred embodiment may also include a cooling tray fabricated from a metallic material such as aluminum. As such, the tray will act as a heat sink to thereby draw heat away from the tool holders by conduction methods. Additionally, the cooling tray comprises a cooling plate mechanically coupled to at least one strut for supporting the cooling plate in the cooling chamber of the housing. As such, each strut is sized such that the cooling plate is fully insertable into the cooling chamber when at least one tool holder is positioned thereon.

A method for cooling heat shrink tool holders is also provided. The method comprises the first step of placing heated tool holders in a cooling tray. Next the cooling tray is removably mounted to a cooling unit and then ambient temperature air is propelled over the cooling tray to thereby cool the tool holders to ambient temperature.

BRIEF DESCRIPTION OF THE DRAWINGS

These as well as other features of the present invention, will become more apparent upon reference to the drawings wherein.

DETAILED DESCRIPTION OF THE PREFERRED EMBODIMENT

Figure 1:
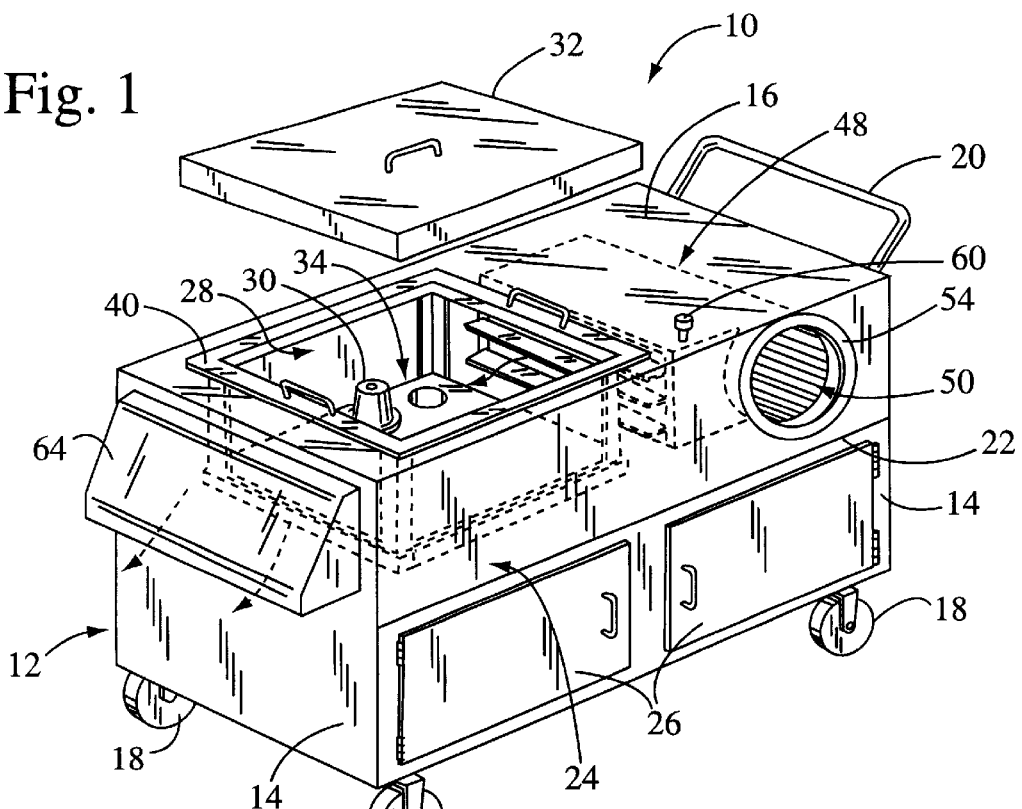
FIG. 1 is a perspective view of a heat shrink tool holder cooler constructed in accordance with the preferred embodiment of the present invention.

Referring now to the drawings wherein the showings are for purposes of illustrating a preferred embodiment of the present invention only, and not for purposes of limiting the same, FIG. 1 is a perspective view of a cooling unit or heat shrink tool holder cooler 10 constructed in accordance with the preferred embodiment of the present invention. The cooler 10 is a mobile unit such as a rectangular cart 12 that can support the necessary elements for cooler 10 to operate. The cart 12 is constructed from four sidewalls 14, a top wall 16 and a bottom wall (not shown). Attached to the bottom wall are four castors 18 which enable the cart to be easily pushed to and from the work area by cart handle 20. Furthermore, a cooling chamber 24 is defined in cart 12 by cooling chamber wall 22, the four sidewalls 14 and the top wall 16. As will be recognized, it is not necessary for cart 12 be rectangular, and that it can be any shape that facilitates the cooling of heat shrink tool holders 30 placed therein. Additionally, under cooling chamber 24 is a storage area defined by the cooling chamber wall 22, the bottom wall of the cart 12 and the four sidewalls 14 for storing machine tool holders, parts, and accessories. The storage area is accessible through the two storage doors 26.

As can be seen in FIG. 1, the cart 12 is also fabricated with a cooling chamber opening 28 disposed in top wall 16. The cooling chamber opening 28 allows access into cooling chamber 24 for inserting and removing cooling tray 34 which accommodates heat shrink tool holders 30. The opening 28 can be covered with a cooling chamber cover 32 in order to help facilitate the cooling of tool holders 30 and for protecting the tool holders 30 from dust and other environmental elements. In the preferred embodiment of the present invention, a tool holder 30 is retained in cooling chamber 24 by the removable cooling tray 34.

Figure 3:
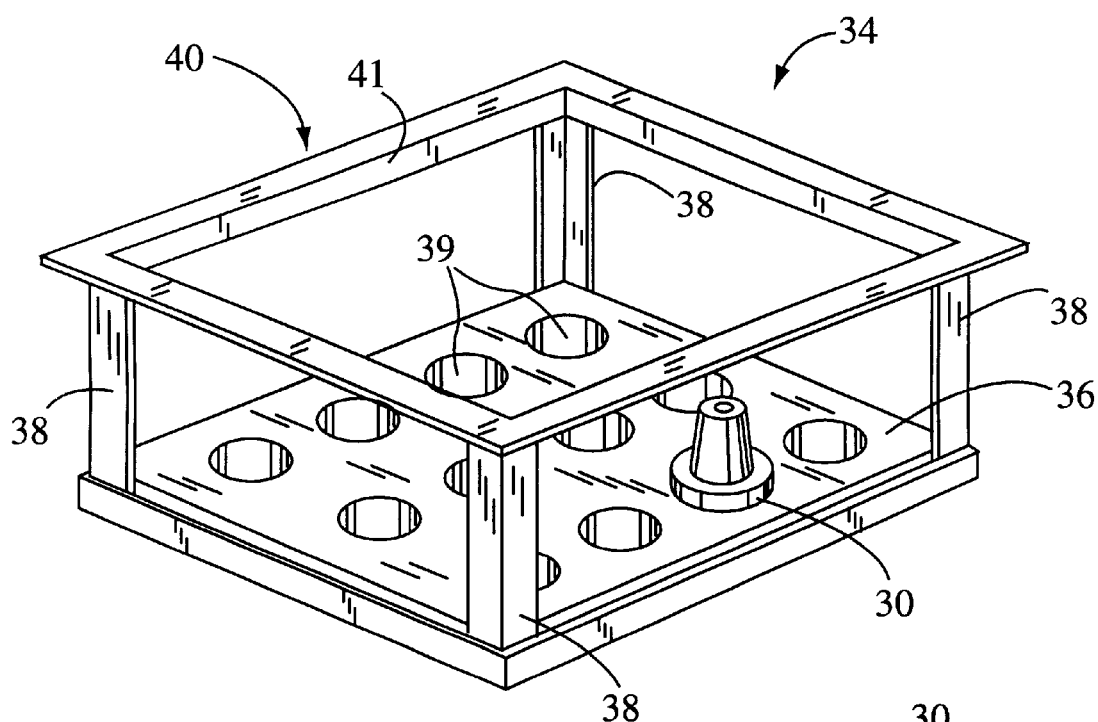
FIG. 3 is a perspective view of a cooling tray of the heat shrink tool holder cooler shown in FIG. 1.

As can best be seen in FIG. 3, the cooling tray 34 itself comprises a generally square cooling plate 36 which is sized to be insertable into the cooling chamber 24 via the opening 28. Disposed within the cooling plate 36 are a plurality of tool holder receptacles 39 for retaining respective ones of a plurality of tool holders 30. The cooling plate 36 may be fabricated from a metallic material such as aluminum whereby the cooling plate 36 acts as a heat sink to draw heat away from heated tool holders 30 by a conduction method. Cooling tray 34 also comprises four vertical support struts 38, the lower ends of which are rigidly attached to respective ones of the four corners of the cooling plate 36. Attached to the top ends of the struts 38 is a generally square support frame 40 which is substantially the same size as cooling plate 36. Vertical struts 38 secure the support frame 40 above the cooling plate 36. The frame 40 is fabricated from a material having a generally L-shaped cross-sectional configuration such that it defines a peripheral inner flange portion 41.

Figure 2:
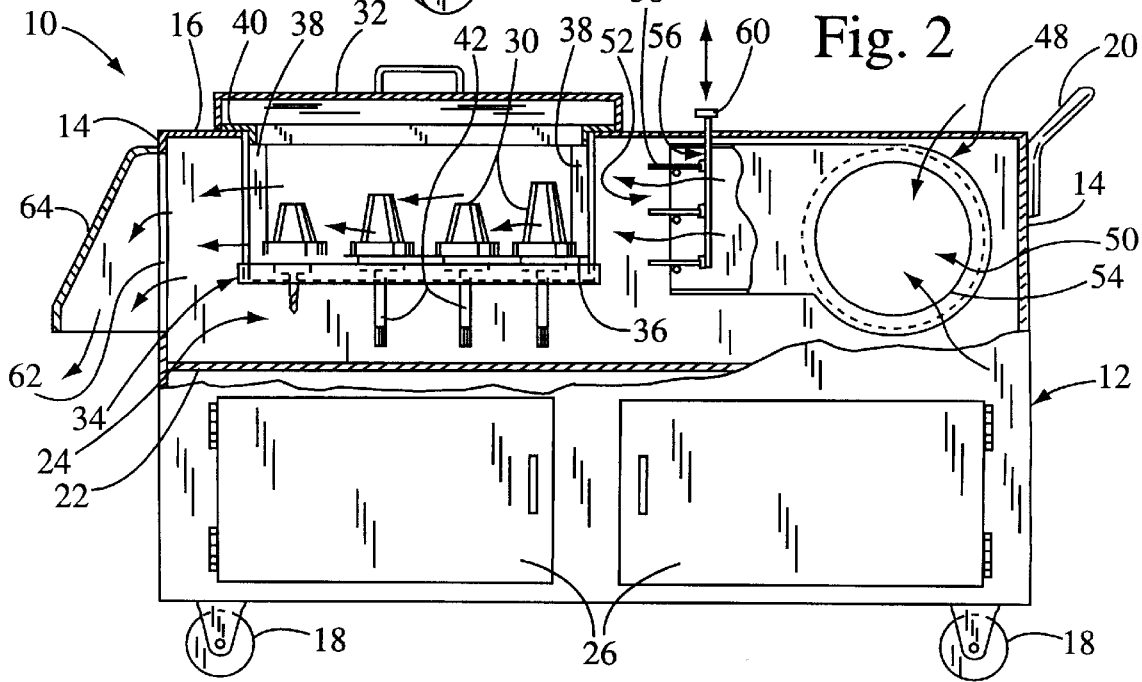
FIG. 2 is a partial cross-sectional view of the tool holder cooler shown in FIG. 1.

As previously described, cooling tray 34 can be inserted into and removed from cart 12 through cooling chamber opening 28. As seen in FIG. 2, the support frame 40 is supported in opening 28 by the top wall 16 of cart 12 such that the cooling plate 36 hangs from support frame 40 by vertical support struts 38. Additionally, the size of vertical support struts 38 may vary depending upon the size of the tool holder 30 and cutting tool 42. For example, if a long shanked cutting tool 42 is used, then the length of the vertical support struts 38 will need to be shortened in order for cooling plate 36 of cooling tray 34 to be fully insertable into cooling chamber 24. Alternatively, if the height of the tool holder 30 is large, then the vertical support struts 38 should be lengthened so that the tool holder 30 is fully enclosed in cooling chamber 24 when cooling plate 36 is inserted therein. Struts 38 may be constructed such that their lengths are adjustable via a set screw in order to configure an appropriate height of the struts 38 according to the size of the tool holders 30 to be inserted in cooling tray 34.

Figure 4:
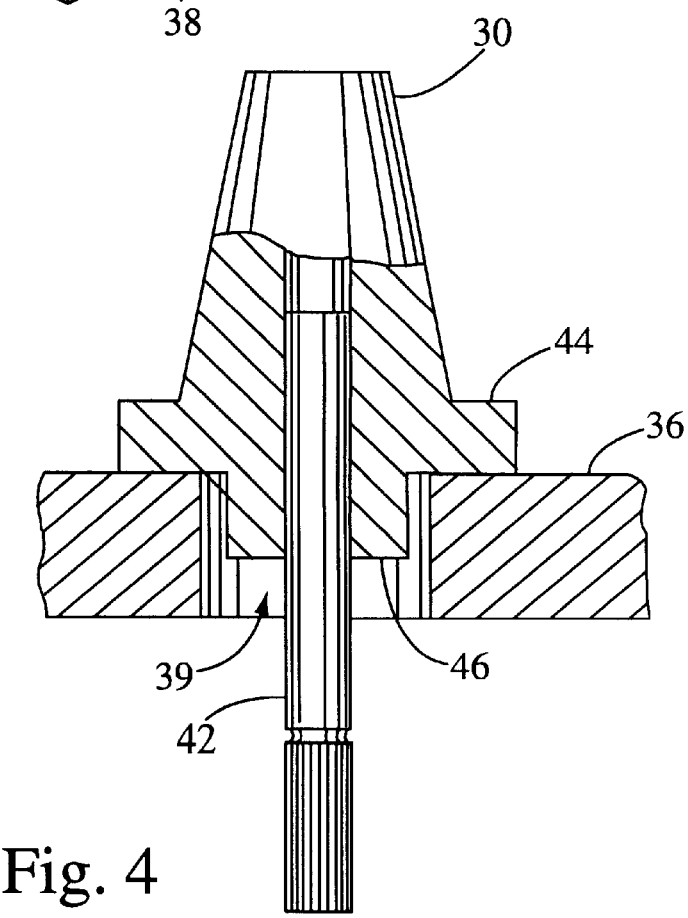
FIG. 4 is a partial cross-sectional view of the cooling tray shown in FIG. 3 as used to retain a heat shrink tool holder and cutting tool.

As indicated above, the cooling plate 36 constructed in accordance with the preferred embodiment of the present invention includes the plurality of circular tool holder receptacles 39 or holes disposed therein which each accommodates a respective tool holder 30 as shown in FIG. 4. The tool holder 30 has an annular flange 44 encircling the perimeter of the tool holder 30. The flange 44 supports the tool holder 30 on cooling plate 36 while still enabling a reduced diameter portion 46 of tool holder 30 and cutting tool 42 to project into and through tool holder receptacle 39. Therefore, in order for proper operation, the diameter of tool holder receptacle 39 is sized smaller than the diameter of flange 40 but larger than the diameter of reduced portion 46 such that flange 44 will be supported by the top surface of cooling plate 36 and not fall through receptacle 39.

In order to cool heated tool holders 30, cooling tray 34 having a plurality of heated tool holders 30 retained thereon, is inserted into the cooling chamber 24 of the cart 12. As seen in FIGS. 1 and 2, the cart 12 supports a blower 48 disposed adjacent to cooling tray 34 for propelling ambient temperature air over the cooling tray 34 and therefore heated tool holders 30. In the preferred embodiment of the present invention, the blower 48 is an electric axial fan with an axial inlet 50 and a radial outlet 52. The axial inlet 50 of blower 48 is in communication with a fresh air inlet port 54 disposed within a sidewall 14 of cart 12. Therefore, blower 48 can draw ambient temperature air through inlet port 54 and into the blower axial inlet 50. Then blower 48 propels the air through radial outlet 52 in a radial stream that can be easily directed.

In the preferred embodiment of the present invention, a damper 56 is positioned at radial outlet 52 in order to regulate the flow of air exiting blower 48. The damper 56 has a plurality of movable louvers 58 hinged to a movable controller 60. The controller 60 is positionable in a vertical direction, as shown by the arrows, such that the louvers 58 are moved in a corresponding direction to divert the flow of air exiting blower 48. Therefore, it is possible to divert the flow of air with the plurality of louvers 58 such that the air can be directed to flow over the cooling plate 36 and therefore over the heated tool holders 30 retained thereon. This is useful since the cooling tray 34 is sized according to the size of the tool holders 30 such that the depth of tray 34 may vary. Since the cooling tray 34 is removable from cart 12, it is possible mount different sizes of cooling trays 34 into the cooling chamber 24 according to the size of the tool holders 30 retained thereon. Therefore with damper 56, it is possible to adjust the flow of air to an optimum direction as shown by the arrows in FIGS. 1 and 2, such that the airflow can be diverted entirely over the heated tool holders 30. Additionally, it will be recognized that the damper 56 can also be moved to a position whereby the louvers 58 can block or restrict the flow of air over the cooling tray 34 as may be needed when inserting or removing the cooling tray 34 or a tool holder 30 without turning off blower 48.

In the tool holder cooler 10 constructed in accordance with the preferred embodiment of the present invention, ambient temperature air flows over the heated tool holders 30 thereby cooling the tool holders 30 by a convection process in conjunction with the conduction method of cooling from the aluminum cooling tray 34 as previously mentioned. In order for proper cooling, the air flowing over the tool holders 30 must be able to exit the cooling chamber 24 after being heated by the tool holders 30. Therefore, an exhaust port 62 is fabricated in a sidewall 14 of the cart 12 to allow heated air to exit the cooling chamber 24. The exhaust port 62 is positioned in opposed relation to the blower outlet 52 in order to facilitate the removal of heated air from the cooling chamber 24. A hood 64 is mounted on the exterior of sidewall 16 and over exhaust port 62 to deflect the heated air downward upon exiting the cooling chamber 24 to thereby prevent injury to anyone in the vicinity of exhaust port 62.

Therefore, in accordance with the present invention the heat shrink tool holder cooler 10 cools the heat shrink tool holders 30 by propelling a flow of ambient temperature air over them with the blower 48. The cooler 10 is mobile such that it is possible to heat and mount the cutting tools 42 into the tool holders 30 in one location and then transport and cool the tool holders 30 in another location. Additionally, the cooling tray 34 of cooler 10 can be used for the storage of cutting tools 42 joined with tool holders 30 that have already been cooled to ambient temperature.

As will be recognized, it is not necessary that the outlet 52 of blower 48 be directly opposite the exhaust port 62. Other configurations of cart 12 are possible such as having a circular cooling chamber with multiple exhaust ports. Alternatively, the location of the inlet and exhaust ports can also be varied in order to optimize the airflow for use with different types of blowers.

Additionally, other kinds of heat shrink fittings may be used with the cooler 10. As will be recognized, it is possible to configure the cooling tray 34 to retain heat shrink fittings such as machine tool extensions. Therefore machine tool extensions may also be cooled in cooler 10 as well. Additionally, it is possible to configure cooling tray 34 to retain both heat shrink machine tool holders 30 and heat shrink machine tool extensions simultaneously such that both types of heat shrink fittings are cooled at the same time.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A cooling unit for reducing a temperature of at least one heat shrink tool holder, the cooling unit comprising:
    a housing with an exteriorly accessible cooling chamber;
    a cooling tray accessibly removably mountable within the cooling chamber and having a plurality of receptacles formed therein which are each configured to accommodate a heat shrink tool holder; and
    a blower disposed within the housing proximate the cooling tray for propelling a flow of ambient temperature air over the cooling tray.

2. The cooling unit of claim 1 wherein the housing includes a plurality of castors attached thereto for the purpose of making the cooling unit mobile.

3. The cooling unit of claim 1 further comprising a damper which is disposed within the housing between the cooling chamber and the blower for selectively regulating the flow of air over the cooling tray disposed within the cooling chamber.

4. The cooling unit of claim 3 wherein the blower is an axial fan having an axial inlet in fluid communication with the ambient temperature air and a radial outlet disposed adjacent the damper.

5. The cooling unit of claim 4 wherein the housing further comprises:
    a fresh air inlet port in fluid communication with the axial inlet of the fan and configured to allow the ambient temperature air to enter the fan; and
    an exhaust port disposed adjacent the cooling chamber in opposed relation to the radial outlet of the fan and configured such that air exits the housing after passing over the cooling tray disposed within the cooling chamber.

6. The cooling unit of claim 3 wherein the cooling tray comprises:
    a cooling plate; and
    at least one strut attached to the cooling tray for supporting the cooling plate in the cooling chamber.

7. The cooling unit of claim 6 wherein the strut is sized such that the cooling plate and the at least one tool holder positioned thereon is fully insertable into the cooling chamber.

8. The cooling unit of claim 1 wherein the cooling tray is fabricated from a metallic material that functions as a heat sink.

9. The cooling unit of claim 8 wherein the metallic material is aluminum.

10. The cooling unit of claim 1 wherein at least one of the receptacles of the cooling tray is configured to accommodate a heat shrink machine tool extension.

11. A method of cooling heat shrink tool holders comprising the steps of:
    a) placing heated tool holders in a cooling tray;
    b) accessibly removably mounting the cooling tray in an exteriorly accessible cooling chamber of a cooling unit; and
    c) propelling ambient temperature air over the cooling tray to thereby cool the tool holders to ambient temperature.

12. A cooling unit for reducing a temperature of at least one heat shrink tool holder, the cooling unit comprising:
    a housing defining a cooling chamber;
    a cooling tray removably mounted within the housing and having a plurality of receptacles formed therein which are each configured to accommodate a heat shrink tool holder;
    a blower disposed within the housing proximate the cooling tray for propelling a flow of ambient temperature air over the cooling tray to thereby cool the heat shrink tool holder;
    a damper disposed within the housing between the cooling chamber and the blower for selectively regulating the flow of air over the cooling tray disposed within the cooling chamber; and wherein the blower is an axial fan having an axial inlet in fluid communication with the ambient temperature air and a radial outlet disposed adjacent the damper.

13. The cooling unit of claim 12 wherein the housing further comprises:

a fresh air inlet port in fluid communication with the axial inlet of the fan and configured to allow the ambient temperature air to enter the fan; and an exhaust port disposed adjacent the cooling chamber in opposed relation to the radial outlet of the fan and configured such that air exits the housing after passing over the cooling tray disposed within the cooling chamber.

* * * * *